(12) United States Patent
Wang et al.

(10) Patent No.: US 8,982,723 B2
(45) Date of Patent: Mar. 17, 2015

(54) METHOD AND SYSTEM FOR SYNCHRONIZING ACCESS STRATUM SECURITY ALGORITHM

(75) Inventors: Bo Wang, Shenzhen (CN); Jinglan Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 150 days.

(21) Appl. No.: 13/699,720

(22) PCT Filed: Oct. 21, 2010

(86) PCT No.: PCT/CN2010/077953
§ 371 (c)(1),
(2), (4) Date: Nov. 24, 2012

(87) PCT Pub. No.: WO2011/147152
PCT Pub. Date: Dec. 1, 2011

(65) Prior Publication Data
US 2013/0064186 A1 Mar. 14, 2013

(30) Foreign Application Priority Data
May 27, 2010 (CN) .......................... 2010 1 0187361

(51) Int. Cl.
*H04W 12/08* (2009.01)
*H04L 29/06* (2006.01)
(52) U.S. Cl.
CPC ............... *H04W 12/08* (2013.01); *H04L 63/20* (2013.01)
USPC ............................................ 370/252; 726/27
(58) Field of Classification Search
None
See application file for complete search history.

(56) References Cited

U.S. PATENT DOCUMENTS

2007/0230707 A1* 10/2007 Blom et al. .................... 380/277
2008/0311923 A1* 12/2008 Petrovic et al. ............... 455/450
(Continued)

FOREIGN PATENT DOCUMENTS

CN 1964564 A 5/2007
CN 101242630 A 8/2008
(Continued)

OTHER PUBLICATIONS

P.R. China, State Intellectual Property Office, International Search Report for International Application No. PCT/CN2010/077953, mailed Feb. 10, 2011.

*Primary Examiner* — Michael J Moore, Jr.
*Assistant Examiner* — Duc Duong
(74) *Attorney, Agent, or Firm* — Bright IP Law Offices (57) ABSTRACT

The disclosure discloses a method and a system for synchronizing an Access Stratum (AS) security algorithm. The method comprises: a control plane notifying a user plane to start a decryption exception detection when sending an Radio Resource Control (RRC) connection re-establishment message (100); the user plane performing the decryption exception detection on a service message received after the RRC connection re-establishment, and sending a decryption exception instruction to the control plane when discovering the decryption exception of the service message (101); and the control plane performs a corresponding exception process according to the decryption exception instruction (102). With the method, the exception of the AS security algorithm configured for User Equipment (UE) in the RRC connection re-establishment is discovered in time, the bandwidth waste caused by invalid data packets of an air interface is maximally avoided, and the prompt exception recovery is improved, so as to further improve the user experience before and after a handover.

18 Claims, 4 Drawing Sheets

(56) References Cited

U.S. PATENT DOCUMENTS

| | | |
|---|---|---|
| 2010/0173610 A1* | 7/2010 | Kitazoe et al. ............... 455/411 |
| 2011/0038480 A1* | 2/2011 | Lin ............................. 380/270 |
| 2012/0033815 A1* | 2/2012 | Kuo ............................ 380/272 |
| 2012/0039472 A1* | 2/2012 | Liu et al. ..................... 380/270 |
| 2012/0307803 A1* | 12/2012 | Yang et al. ................... 370/331 |

FOREIGN PATENT DOCUMENTS

| | | |
|---|---|---|
| CN | 101702818 A | 5/2010 |
| GB | 2455610 A | 6/2009 |

* cited by examiner

METHOD AND SYSTEM FOR SYNCHRONIZING ACCESS STRATUM SECURITY ALGORITHM

CROSS REFERENCE TO RELATED APPLICATIONS

This application is the U.S. National Stage of International Patent Application No. PCT/CN2010/077953 filed on Oct. 21, 2010, which claims priority to Chinese Patent Application No. 201010187361.3 filed on May 27, 2010. Both the PCT Application and Chinese Application are hereby incorporated by reference in their entirety.

FIELD OF THE INVENTION

The disclosure relates to the Long Term Evolution (LTE) technology, in particular to a method and a system for synchronizing an Access Stratum (AS) security algorithm in the Radio Resource Control (RRC) connection re-establishment after a handover.

BACKGROUND OF THE INVENTION

At present, in an LTE system, with a highly-dispersed geographical location and logical structure, an E-UTRAN Node B (eNB) cannot be controlled in security by an operator intensively, so that each eNB is in a non-secure area.

The eNB needs to select an AS security algorithm suitable for itself according to respective specific condition and the security capability of a User Equipment (UE). The basic principle of selecting the AS security algorithm is: the security capability information of the UE is sent to the eNB by a signaling procedure, (for example, a core network carries the security capability of the UE to the eNB by an initial context establishment request message), the eNB selects the AS security algorithm with the highest priority from the intersection of the AS security algorithms supported by itself and the UE. During a handover, the eNB needs to update the AS security algorithm according to the principle above and notifies the UE of the new AS security algorithm by an air interface message.

Each eNB needs to maintain the AS security parameters (including algorithm and key) between itself and the UE on its own. Obviously, each eNB may support different AS security algorithms. When switched across the eNB, the UE may further initiate an RRC connection re-establishment at a target eNB if switched unsuccessfully, at the moment, if the target eNB does not support the original AS security algorithm of the UE, the AS security algorithm will not be synchronous, specifically:

It is assumed that the AS security algorithm supported by eNB1 is not supported by eNB2, when the UE initiates the RRC connection re-establishment to eNB2 as switched to eNB2 unsuccessfully (for example, the RRC re-configuration is invalid during the handover), if the UE does not select an AS security algorithm again according to the AS security algorithm supported by eNB2 but still adopts the original AS security algorithm (i.e., that supported by eNB1) for the integrity protection and encryption of the RRC re-establishment completion message, eNB2 will surely fail to decrypt the message and check its integrity as not supporting the original AS security algorithm, which will ultimately result in the failed access of the switched UE, thereby seriously affecting the experience of users.

For the problem that the AS security algorithm is not synchronous as the AS security algorithm is not updated in the RRC connection re-establishment, generally, an AS security algorithm configuration cell may be added in the RRC connection re-establishment message sent from the eNB to the UE to solve it. However, a new problem may occur: a new AS security algorithm configuration can be sent to the UE only by the RRC connection re-establishment message, whose integrity itself is not protected, therefore, if a malicious attacker tempers with a data encryption algorithm carried in the RRC connection re-establishment message, the eNB and UE cannot discover this in time, accordingly, there will be a lot of invalid data packets which cannot be decrypted by the eNB in the air interface in a period, so as to not only waste air interface resources but also further affect user experience seriously.

SUMMARY OF THE INVENTION

In view of this, the disclosure provides a method and a system for synchronizing an AS security algorithm, to duly discover the exception of the AS security algorithm configured for a UE in an RRC connection re-establishment, maximally avoid the bandwidth waste caused by invalid data packets in an air interface, and improve the prompt exception recovery, so as to further improve the user experience before and after a handover.

To achieve the objective, the technical solution of the disclosure is implemented as follows:

The disclosure provides a method for synchronizing an AS security algorithm, including:

a control plane notifying a user plane to start a decryption exception detect on when sending an RRC connection re-establishment message;

the user plane performing the decryption exception detection on a service message received after the RRC connection re-establishment, and sending a decryption exception instruction to the control plane when discovering the decryption exception of the service message; and the control plane performing a corresponding exception process according to the decryption exception instruction.

In the solution, the method further includes: a detection counter and its detection threshold are preset; and if the detection times of the decryption exception reach the detection threshold or the user plane has reported the decryption exception instruction, the user plane stops the decryption exception detection.

In the solution, the method further includes: an exception counter and its exception threshold are preset, wherein the exception counter is configured to count the times of discovering the decryption exception of the service message by the decryption exception detection; and if the exception counter reaches the exception threshold, the user plane reports the decryption exception instruction and stops the decryption exception detection.

In the solution, the exception threshold of the exception counter is less than or equal to the detection threshold of the detection counter.

In the solution, the method further includes: the detection counter and its detection threshold, and the exception counter and its exception threshold are preset.

The operation of the user plane performing the decryption exception detection on the service message received after the RRC connection re-establishment, and sending the decryption exception instruction to the control plane when discovering the decryption exception of the service message further includes:

a Packet Data Convergence Protocol (PDCP) layer of the user plane receiving the notification from the control plane and decrypts the message received after the RRC connection re-establishment;

the PDCP layer parsing the decrypted message's content and increments the detection counter; and when the decrypted message does not comply with the Internet Protocol (IP), incrementing the exception counter, and when the exception counter reaches the exception threshold, the PDCP layer of the user plane sending the decryption exception instruction to the control plane and stopping the decryption exception detection at the same time.

In the solution, the method further includes: the detection counter and its detection threshold, and the exception counter and its exception threshold are preset.

When an eNB and UE performing the RRC connection re-establishment support the Robust Header Compression (ROHC), the operation of the user plane performing the decryption exception detection on the service message received after the RRC connection re-establishment, and sending the decryption exception instruction to the control plane when discovering the decryption exception of the service message further includes:

a PDCP layer of the user plane receives the notification from the control plane and decrypts the message received after the RRC connection re-establishment;

the PDCP layer performs an ROHC decompression on the decrypted message, and when the decompression is successful, the PDCP layer parses the decompressed message's content and increments the detection counter; and when the decompression fails or the parsed decompressed message does not comply with the IP rule, the PDCP layer increments the exception counter, and when the exception counter reaches the exception threshold, the PDCP layer sends the decryption exception instruction to the control plane and stops the decryption exception detection.

In the solution, in a handover before the RRC correction re-establishment, there is uplink forwarding data.

The method further includes: presetting a detection counter and its detection threshold, and an exception counter and its exception threshold, and performing a message matching operation in an uplink reordering process of a PDCP layer of the user plane;

the message matching operation includes:

the PDCP layer of the user plane receiving the notification from the control plane and decrypting the message received after the RRC connection re-establishment;

the PDCP layer performing an IP header matching between the decrypted message's content and the uplink forwarding data and incrementing the detection counter; and when the matching of the IP headers fails, the PDCP layer incrementing the exception counter, and when the exception counter reaches the exception threshold, sending the decryption exception instruction to the control plane and stopping the decryption exception detection.

The disclosure provides a system for synchronizing an AS security algorithm, including at least a control plane and a user plane, wherein the control plane is configured to notify the user plane to start a decryption exception detection when sending an RRC connection re-establishment message, and perform a corresponding exception process according to an exception instruction; and the user plane is configured to perform the decryption exception detection on a service message received after the RRC connection re-establishment, and send the decryption exception instruction to the control plane when discovering the decryption exception of the service message.

In the solution, the user plane is configured to perform the following operations:

a PDCP layer of the user plane receives the notification from the control plane and decrypts the message received after the RRC connection re-establishment;

the PDCP layer parses the decrypted message's content and increments the detection counter; and when the decrypted message does not comply with the IP, the PDCP layer increments the exception counter, and when the exception counter reaches the exception threshold, the PDCP layer of the user plane sends the decryption exception instruction to the control plane and stops the decryption exception detection.

In the solution, the user plane is configured to perform the following operations:

a PDCP layer of the user plane receives the notification from the control plane and decrypts the message received after the RRC connection re-establishment;

the PDCP layer performs an ROHC decompression on the decrypted message, and when the decompression is successful, parses the decompressed message's content and increments the detection counter; and when the decompression fails or the parsed decompressed message does not comply with the IP rule, the PDCP layer increments the exception counter, and when the exception counter reaches the exception threshold, sends the decryption exception instruction the control plane and stops the decryption exception detection.

In the solution, the user plane is further configured to perform a message matching operation in the uplink reordering process of the PDCP layer.

In the solution, the user plane is configured red to perform the following operations:

the PDCP layer of the user plane receives the notification from the control plane and decrypts the message received after the RRC connection re-establishment;

the PDCP layer performs an IP header match between the decrypted message's content and the uplink forwarding data, and increments the detection counter; and when the matching of the IP headers fails, the PDCP layer increments the exception counter, and when the exception counter reaches the exception threshold, sends the decryption exception instruction to the control plane and stops the decryption exception detection.

It can be seen from the technical solution of the disclosure that, the control plane notifies the user plane to start the decryption exception detection when sending the RRC connection re-establishment message; the user plane performs the decryption exception detection on the service message received after the RRC connection re-establishment, and sends the decryption exception instruction to the control plane when discovering the decryption exception of the service message; and the control plane performs the corresponding exception processing according to the exception instruction. Through the disclosure, the exception of the AS security algorithm configured for the UE in the RRC connection re-establishment is discovered in time, the bandwidth waste caused by the invalid data packets of the air interface is maximally avoided, and the prompt exception recovery is improved, so as to further improve the user experience before and after the handover. In this text, the control plane of a base station is called the control plane for short, and the user plane of the base station is called the user plane for short.

DETAILED DESCRIPTION OF THE EMBODIMENTS

The control plane and user plane in this text refer to the control plane and user plane of a base station respectively.

Figure 1:
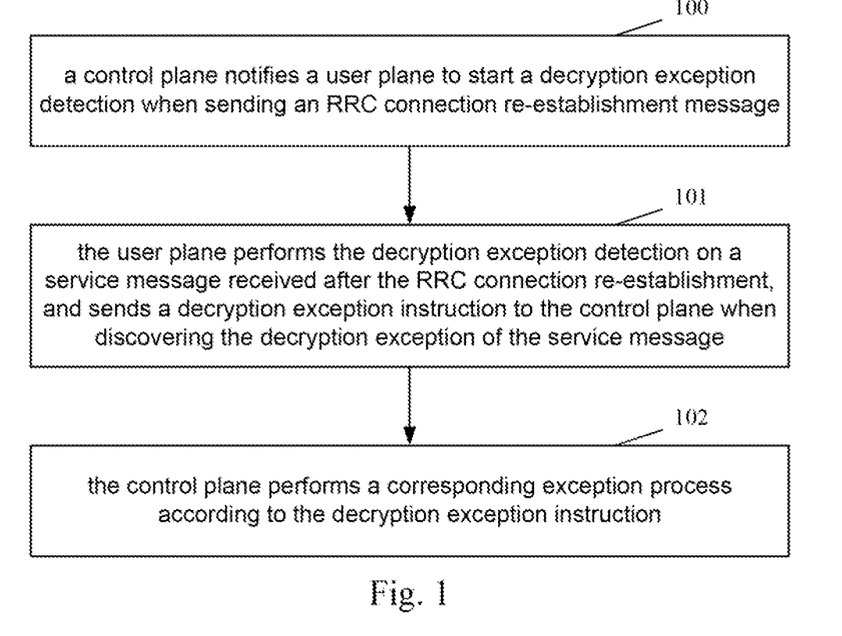
FIG. 1 is a diagram depicting a flow chart of synchronizing an AS algorithm of the disclosure.

FIG. 1 is a diagram depicting a flow chart of synchronizing an AS algorithm in the RRC connection re-establishment after a handover of the disclosure, as shown, the steps are as follows:

Step 100: A control plane notifies a user plane to start a decryption exception detection when sending an RRC connection re-establishment message.

Step 101: The user plane performs the decryption exception detection on a service message received after the RRC connection re-establishment, and sends a decryption exception instruction to the control plane when discovering the decryption exception of the service message.

In this step, the decryption exception detection on the received service message is the conventional technical means of those skilled in the art, with the specific implementation method not intended to limit the scope of protection of the disclosure, thereby needing no further detailed description.

In the step, furthermore, a detection counter and its detection threshold may be preset, and if the detection times of the decryption exception reach the detection threshold or the user plane has reported the decryption exception instruction, the user plane stops the decryption exception detection.

Furthermore, an exception counter and its exception threshold may be further preset, wherein the exception counter is configured to count the times of discovering the decryption exception of, the service message by the decryption exception detection. If the exception counter reaches the exception threshold, the user plane reports the decryption exception instruction and stops the decryption exception detection.

Here, the exception threshold of the exception counter is less than or equal to the detection threshold of the detection counter.

Step 102: The control plane performs a corresponding exception process according to the decryption exception instruction. In this step, it is emphasized that the control plane can correspondingly process the exception in time according to the exception instruction of the user plane, but how to process it is not protected in this disclosure nor intended to limit the scope of protection of the disclosure.

In the disclosure, with the synchronization process of the user plane (i.e., Step 101) introduced in the RRC connection re-establishment, the eNB and UE discover the exception condition of the AS security algorithm configured for the UE in the RRC connection re-establishment in time to maximally avoid the bandwidth waste caused by the invalid data packets of an air interface and improve the prompt exception recovery, so as to further improve the user experience before and after the handover.

Figure 2:
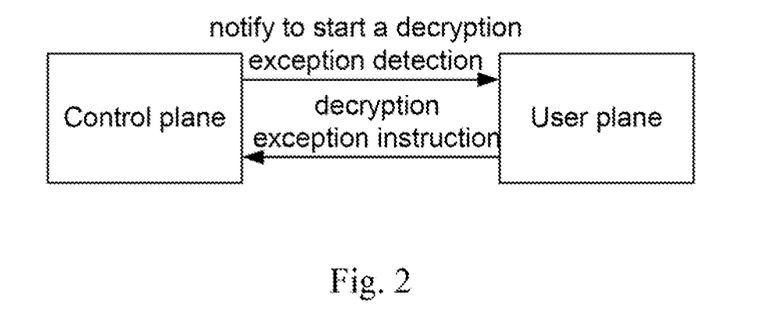
FIG. 2 is a diagram showing the composition structure of a system for synchronizing an AS security algorithm of the disclosure.

FIG. 2 is a diagram showing the composition structure of a system for synchronizing an AS security algorithm of the disclosure, as shown, the system at least includes a control plane and a user plane, wherein, the control plane is configured to notify the user plane to start a decryption exception detection when sending an RRC connection re-establishment message, and perform a corresponding exception process according to a decryption exception instruction sent by the user plane; and the user plane is configured to perform the decryption exception detection on a service message received after the RRC connection re-establishment, and send the decryption exception instruction to the control plane when discovering the decryption exception of the service message.

Furthermore, a detection counter and its detection threshold, and an exception counter and its exception threshold are preset in the user plane.

The user plane is configured to perform the following operations: the PDCP layer of the user plane receives the notification from the control plane and decrypts the message received after the RRC connection re-establishment; the PDCP layer parses the decrypted message's content, and increments the detection counter; and when the decrypted message does not comply with the IP, the PDCP layer increments the exception counter, and when the exception counter reaches the exception threshold, the PDCP layer of the user plane sends the decryption exception instruction to the control plane and stops the decryption exception detection at the same time.

Furthermore, when the eNB and UE performing the RRC connection re-establishment support the ROHC, the operation of the user plane performing the decryption exception detection on the service message received after the RRC connection re-establishment, and sending the decryption exception instruction to the control plane when discovering the decryption exception of the service message includes:

the PDCP layer of the user plane receives the notification from the control plane and decrypts the message received after the RRC connection re-establishment;

the PDCP layer performs an ROHC decompression on the decrypted message, and when the decompression is successful, parses the decompressed message's content and increments the detection counter; and when the decompression fails or the parsed decompressed message does not comply with the IP rule, the PDCP layer increments the exception counter, and when the exception counter reaches the exception threshold, sends the decryption exception instruction to the control plane and stops the decryption exception detection at the same time.

Furthermore, in the handover before the RRC connection re-establishment, there is uplink forwarding data, and the user plane is further configured to perform a message matching operation in the uplink reordering processing of the PDCP layer; and correspondingly the message matching operation of the user plane is as follows; the PDCP layer of the user plane receives the notification from the control plane and decrypts the message received after the RRC connection re-establishment; the PDCP layer performs an IP header match between the decrypted message's content and the uplink forwarding data, and increments the detection counter; and, when the matching of the IP headers fails, the PDCP layer increments the exception counter, and when the exception counter reaches the exception threshold, sends the decryption exception instruction to the control plane and stops the decryption exception detection at the same time.

The method is described below with reference to embodiments in detail. The decryption processing referred in the following embodiments may be a null algorithm processing.

Figure 3:
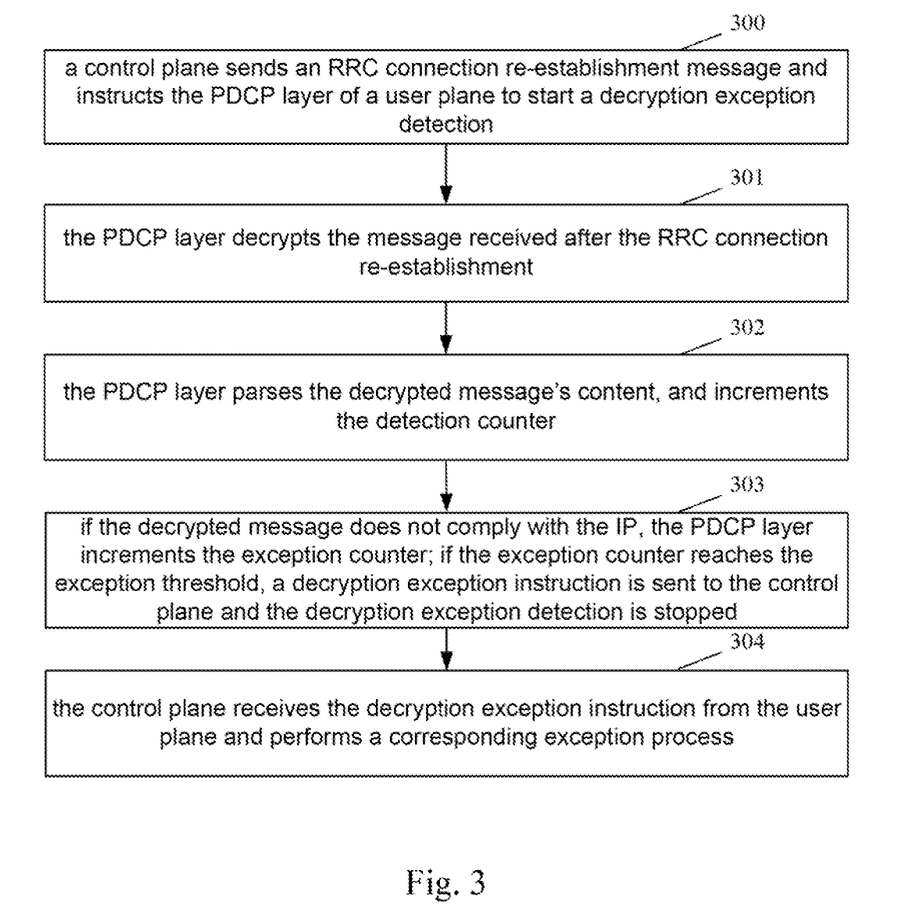
FIG. 3 is a diagram depicting a flow chart of synchronizing an AS algorithm in the first embodiment of the disclosure.

FIG. 3 is a diagram depicting a flow chart of synchronizing an AS algorithm in the first embodiment of the disclosure; an LTE service is a packet service based on IP, therefore, in the first embodiment, it is assumed that an exception analysis processing is performed on a received packet message on a PDCP layer, i.e., an exception analysis is made on the received message decrypted by the PDCP layer, as shown in FIG. 3, including the following steps:

Step 300: A control plane sends an RRC connection re-establishment message and instructs the PDCP layer of a user plane to start a decryption exception detection.

Step 301: The PDCP layer decrypts the message received after the RRC connection re-establishment.

Step 302: The PDCP layer parses the decrypted message's content, and increments the detection counter.

When the detection counter reaches the preset detection threshold, the decryption exception detection is stopped.

Step 303: When the decrypted message does not comply with the IP, for example, the IP header of the message has been damaged, the PDCP layer increments the exception counter.

When the exception counter reaches the exception threshold, the PDCP layer of the user plane sends a decryption exception instruction to the control plane, and stops the decryption exception detection at the same time.

Step 304: The control plane receives the decryption exception instruction from the user plane and performs a corresponding exception process.

Steps 301 to 303 depict the message matching operation in the uplink reordering processing of the PDCP layer of the user plane when the PDCP layer performs an exception analysis processing on the received packet message.

Figure 4:
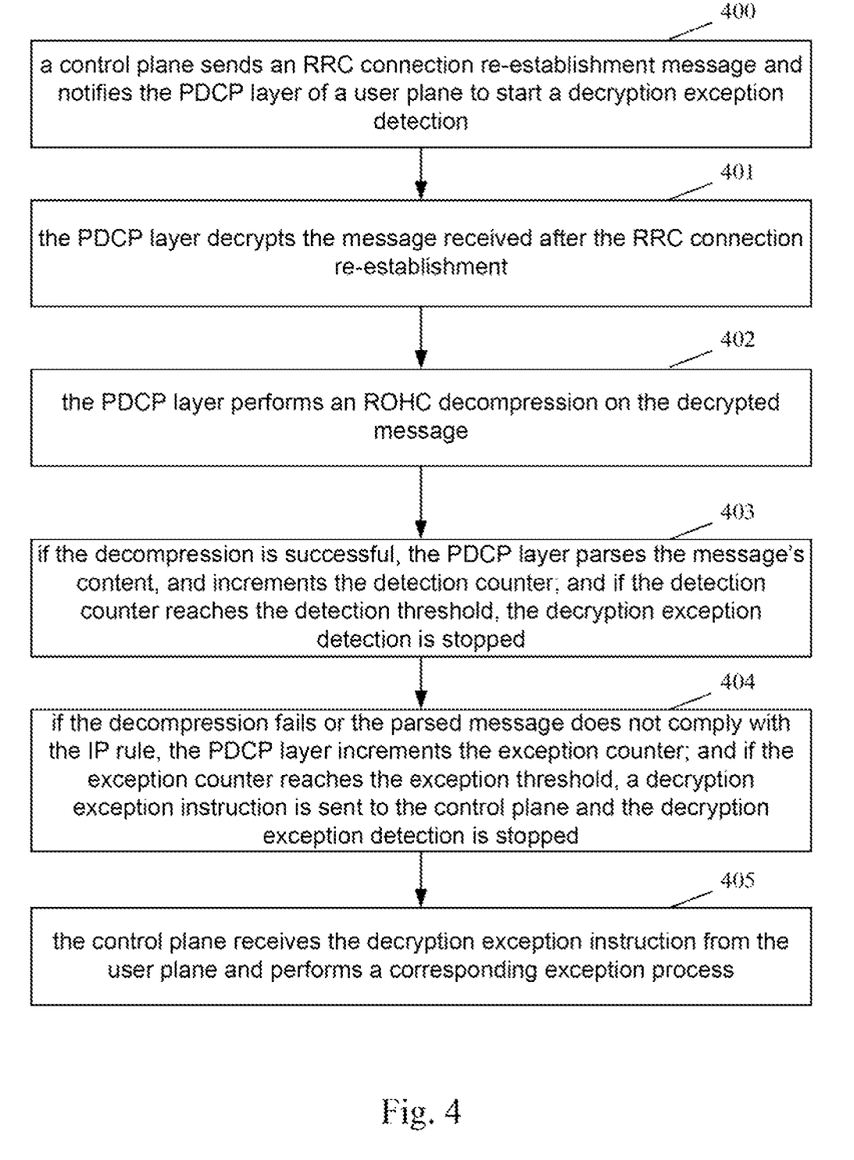
FIG. 4 is a diagram depicting a flow chart of synchronizing an AS algorithm in the second embodiment of the disclosure.

FIG. 4 is a diagram depicting a flow chart of synchronizing an AS algorithm in the second embodiment of the disclosure, in the second embodiment, it is assumed that an eNB and a UE support an ROHC function, a decryption exception detection can be performed at the output end of a decompressor, as shown in FIG. 4, including the following steps:

Step 400: A control plane sends an RRC connection re-establishment message and notifies the PDCP layer of a user plane to start the decryption exception detection.

Step 401: The PDCP layer decrypts the message received after the RRC connection re-establishment.

Step 402: The PDCP layer performs an ROHC decompression on the decrypted message.

Step 403: When the decompression is successful, the decompressed message's content are further parsed, and the PDCP layer increments the detection counter.

If the detection counter reaches the detection threshold, the decryption exception detection is stopped.

Step 404: When the decompression fails or the parsed message does not comply with the IP rule, the PDCP layer increments the exception counter.

If the exception counter reaches the exception threshold, a decryption exception instruction is sent to the control plane, and the decryption exception detection is stopped at the same time.

Step 405: The control plane receives the decryption exception instruction from the user plane and performs a corresponding exception process.

Steps 401 to 404 show a message matching operation in the uplink reordering process of the PDCP layer of the user plane when the eNB and UE support the ROHC function.

Figure 5:
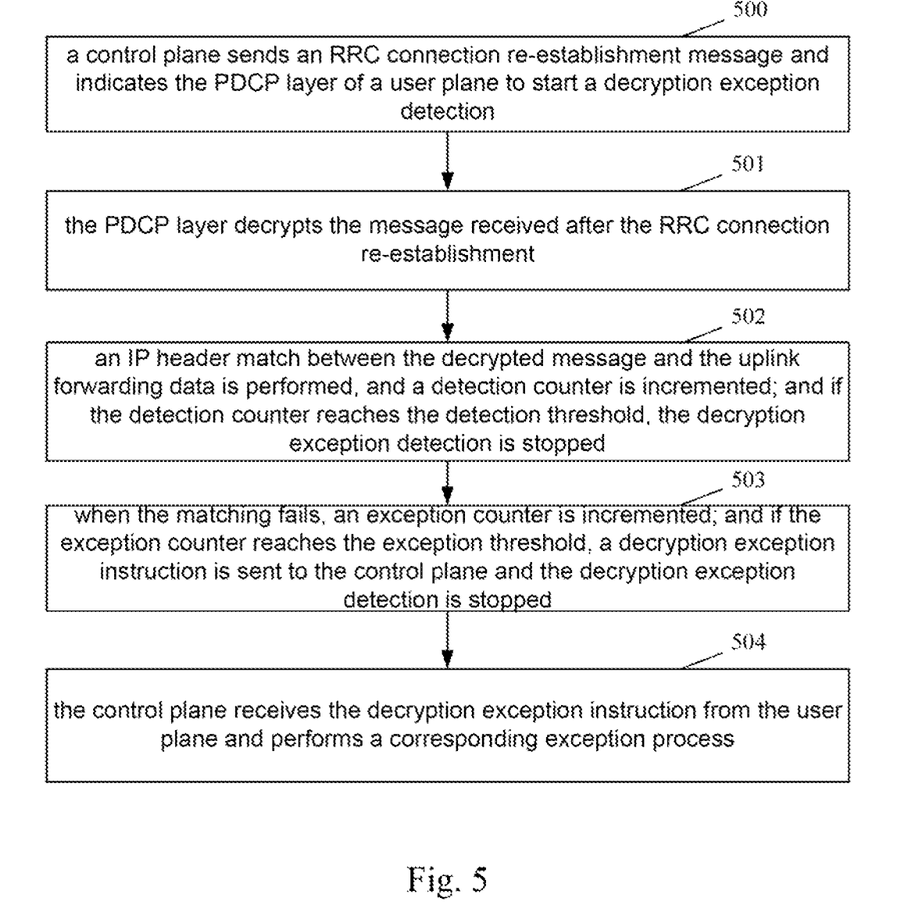
FIG. 5 is a diagram depicting a flow chart of synchronizing an AS algorithm in the third embodiment of the disclosure.

FIG. 5 is a diagram depicting a flow chart of synchronizing an AS algorithm in the third embodiment of the disclosure; if there is uplink forwarding data when a UE is switched, a message matching operation may be further performed in the uplink reordering processing of a PDCP layer. Specifically, with the uplink forwarding data forwarded to a target side as the standard, a message received by the target side after the RRC connection re-establishment is compared with the standard to further detect the decryption exception, as shown in FIG. 5, including:

Step 500: A control plane sends an RRC connection re-establishment message and indicates the PDCP layer of a user plane to start a decryption exception detection.

Step 501: The PDCP layer decrypts the message received after the RRC connection re-establishment.

Step 502: The PDCP layer performs an IP header match between the decrypted message's content and the uplink forwarding data, and a detection counter is incremented.

If the detection counter reaches the detection threshold, the decryption exception detection is stopped.

Step 503: When the matching of the IP header fails, an exception counter is incremented.

If the exception counter reaches the exception threshold, the PDCP layer of the user plane sends a decryption exception instruction to the control plane, and the decryption exception detection is stopped at the same time.

Step 504: The control plane receives the decryption exception instruction from the user plane and performs a corresponding exception process.

Steps 501 to 503 show the message matching operation in the uplink reordering process of the PDCP layer of the user plane when the UE is switched and there is uplink forwarding data.

The third embodiment shown in FIG. 5 can be either combined with the first embodiment or the second embodiment, and the specific combination is easy to implement after those skilled in the art know the method, thereby needing no further description.

The above are only preferred embodiments of the disclosure and not intended to limit the scope of protection of the disclosure; any modifications, equivalent replacements, improvements and the like within the spirit and principle of the disclosure shall fall within the scope of protection of the disclosure.

What is claimed is:

1. A method for synchronizing an Access Stratum (AS) security algorithm, comprising:
   a control plane notifying a user plane to start a decryption exception detection when sending an Radio Resource Control (RRC) connection re-establishment message;
   the user plane performing the decryption exception detection on a service message received after the RRC connection re-establishment, and sending a decryption exception instruction to the control plane when the decryption exception of the service message is discovered; and
   the control plane performing a corresponding exception process according to the decryption exception instruction.

2. The method according to claim 1, further comprising: presetting a detection counter and its detection threshold; and
   if the detection times of the decryption exception reach the detection threshold or the user plane has reported the decryption exception instruction, the user plane stopping the decryption exception detection.

3. The method according to claim 2, further comprising: presetting an exception counter and its exception threshold, wherein the exception counter is configured to count the times of discovering the decryption exception of the service message by the decryption exception detection; and
    if the exception counter reaches the exception threshold, the user plane reporting the decryption exception instruction and stopping the decryption exception detection.

4. The method according to claim 3, wherein the exception threshold of the exception counter is less than or equal to the detection threshold of the detection counter.

5. The method according to claim 1, further comprising: presetting a detection counter and its detection threshold, and an exception counter and its exception threshold, wherein
    the operation of the user plane performing the decryption exception detection on the service message received after the RRC connection re-establishment, and sending the decryption exception instruction to the control plane when the decryption exception of the service message is discovered further comprises:
    a Packet Data Convergence Protocol (PDCP) layer of the user plane receiving the notification from the control plane and decrypting the message received after the RRC connection re-establishment;
    the PDCP layer parsing the decrypted message's content and incrementing the detection counter; and
    when the decrypted message does not comply with the Internet Protocol (IP), incrementing the exception counter, and when the exception counter reaches the exception threshold, the PDCP layer of the user plane sending the decryption exception instruction to the control plane and stopping the decryption exception detection at the same time.

6. The method according to claim 5, wherein, in a handover before the RRC connection re-establishment, there is uplink forwarding data; and
    the method further comprising: performing a message matching operation in the uplink reordering processing of the PDCP layer of the user plane;
    wherein the message matching operation comprises:
    the PDCP layer of the user plane receiving the notification from the control plane and decrypting the message received after the RRC connection re-establishment;
    the PDCP layer performing an IP header matching between the decrypted message's content and the uplink forwarding data and incrementing the detection counter; and
    when the matching of the IP headers fails, incrementing the exception counter, and when the exception counter reaches the exception threshold, sending the decryption exception instruction to the control plane and stopping the decryption exception detection.

7. The method according to claim 1, further comprising: presetting a detection counter and its detection threshold, and an exception counter and its exception threshold, wherein
    when an eNB and UE performing the RRC connection re-establishment support the Robust Header Compression (ROHC), the operation of the user plane performing the decryption exception detection on the service message received after the RRC connection re-establishment, and sending the decryption exception instruction to the control plane when the decryption exception of the service message is discovered further comprises:
    a PDCP layer of the user plane receiving the notification from the control plane and decrypting the message received after the RRC connection re-establishment;
    the PDCP layer performing an ROHC decompression on the decrypted message, and when the decompression is successful, parsing the decompressed message's content and incrementing the detection counter; and
    when the decompression fails or the parsed decompressed message does not comply with the IP rule, incrementing the exception counter, and when the exception counter reaches the exception threshold, sending the decryption exception instruction to the control plane and stopping the decryption exception detection.

8. The method according to claim 7, wherein, in a handover before the RRC connection re-establishment, there is uplink forwarding data; and
    the method further comprising: performing a message matching operation in the uplink reordering processing of the PDCP layer of the user plane;
    wherein the message matching operation comprises:
    the PDCP layer of the user plane receiving the notification from the control plane and decrypting the message received after the RRC connection re-establishment;
    the PDCP layer performing an IP header matching between the decrypted message's content and the uplink forwarding data and incrementing the detection counter; and
    when the matching of the IP headers fails, incrementing the exception counter, and when the exception counter reaches the exception threshold, sending the decryption exception instruction to the control plane and stopping the decryption exception detection.

9. The method according to claim 1, wherein, in a handover before the RRC connection re-establishment, there is uplink forwarding data; and
    the method further comprising: presetting a detection counter and its detection threshold, and an exception counter and its exception threshold, and performing a message matching operation in an uplink reordering process of a PDCP layer of the user plane;
    wherein the message matching operation comprises:
    the PDCP layer of the user plane receiving the notification from the control plane and decrypting the message received after the RRC connection re-establishment;
    the PDCP layer performing an IP header matching between the decrypted message's content and the uplink forwarding data and incrementing the detection counter; and
    when the matching of the IP headers fails, incrementing the exception counter, and when the exception counter reaches the exception threshold, sending the decryption exception instruction to the control plane and stopping the decryption exception detection.

10. A system for synchronizing an AS security algorithm, comprising a memory storing at least a control plane and a user plane, and a processor configured to execute the control plane and the user plane, wherein
    the control plane is configured to notify the user plane to start a decryption exception detection when sending an RRC connection re-establishment message, and perform a corresponding exception process according to an exception instruction; and
    the user plane is configured to perform the decryption exception detection on a service message received after the RRC connection re-establishment, and send the decryption exception instruction to the control plane when discovering the decryption exception of the service message.

11. The system according to claim 10, wherein the user plane is configured to perform the following operations:
    a PDCP layer of the user plane receives the notification from the control plane and decrypts the message received after the RRC connection re-establishment;

the PDCP layer parses the decrypted message's content and increments the detection counter; and when the decrypted message does not comply with the IP, the PDCP layer increments the exception counter, and when the exception counter reaches the exception threshold, the PDCP layer of the user plane sends the decryption exception instruction to the control plane and stops the decryption exception detection.

12. The system according to claim 11, wherein the user plane is further configured to perform a message matching operation in the uplink reordering process of the PDCP layer.

13. The system according to claim 12, wherein the user plane is configured to perform the following operations:

the PDCP layer of the user plane receives the notification from the control plane and decrypts the message received after the RRC connection re-establishment;

the PDCP layer performs an IP header match between the decrypted message's content and the uplink forwarding data, and increments the detection counter; and when the matching of the IP headers fails, the PDCP layer increments the exception counter, and when the exception counter reaches the exception threshold, sends the decryption exception instruction to the control plane and stops the decryption exception detection.

14. The system according to claim 10, wherein the user plane is configured to perform the following operations:

a PDCP layer of the user plane receives the notification from the control plane and decrypts the message received after the RRC connection re-establishment;

the PDCP layer performs an ROHC decompression on the decrypted message, and when the decompression is successful, parses the decompressed message's content and increments the detection counter; and when the decompression fails or the parsed decompressed message does not comply with the IP rule, the PDCP layer increments the exception counter, and when the exception counter reaches the exception threshold, sends the decryption exception instruction the control plane and stops the decryption exception detection.

15. The system according to claim 14, wherein the user plane is further configured to perform a message matching operation in the uplink reordering process of the PDCP layer.

16. The system according to claim 15, wherein the user plane is configured to perform the following operations:

the PDCP layer of the user plane receives the notification from the control plane and decrypts the message received after the RRC connection re-establishment;

the PDCP layer performs an IP header match between the decrypted message's content and the uplink forwarding data, and increments the detection counter; and when the matching of the IP headers fails, the PDCP layer increments the exception counter, and when the exception counter reaches the exception threshold, sends the decryption exception instruction to the control plane and stops the decryption exception detection.

17. The system according to claim 10, wherein the user plane is further configured to perform a message matching operation in the uplink reordering process of the PDCP layer.

18. The system according to claim 17, wherein the user plane is configured to perform the following operations:

the PDCP layer of the user plane receives the notification from the control plane and decrypts the message received after the RRC connection re-establishment;

the PDCP layer performs an IP header match between the decrypted message's content and the uplink forwarding data, and increments the detection counter; and when the matching of the IP headers fails, the PDCP layer increments the exception counter, and when the exception counter reaches the exception threshold, sends the decryption exception instruction to the control plane and stops the decryption exception detection.

* * * * *